United States Patent
Yashiro

(10) Patent No.: US 7,325,187 B2
(45) Date of Patent: Jan. 29, 2008

(54) STRUCTURED DOCUMENT CONVERTING METHOD, RESTORING METHOD, CONVERTING AND RESTORING METHOD, AND PROGRAM FOR SAME

(75) Inventor: Sadao Yashiro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 378 days.

(21) Appl. No.: 10/615,979

(22) Filed: Jul. 10, 2003

(65) Prior Publication Data

US 2004/0025116 A1 Feb. 5, 2004

(30) Foreign Application Priority Data

Jul. 30, 2002 (JP) ............................ 2002-221271

(51) Int. Cl.
*G06F 15/00* (2006.01)
(52) U.S. Cl. ..................... 715/513; 715/522; 715/523
(58) Field of Classification Search ................ 715/513, 715/500, 517, 522, 523; 709/223, 227
See application file for complete search history.

(56) References Cited

U.S. PATENT DOCUMENTS

| | | | |
|---|---|---|---|
| 6,684,222 B1 * | 1/2004 | Cornelius et al. ........ 707/104.1 |
| 6,687,873 B1 * | 2/2004 | Ballantyne et al. ......... 715/500 |
| 2001/0054049 A1 * | 12/2001 | Maeda et al. ................ 707/517 |
| 2002/0002567 A1 * | 1/2002 | Kanie et al. ................ 707/513 |
| 2002/0023113 A1 * | 2/2002 | Hsing et al. ................ 707/513 |
| 2002/0029229 A1 * | 3/2002 | Jakopac et al. ............. 707/500 |
| 2002/0078105 A1 * | 6/2002 | Hamada et al. ............. 707/530 |
| 2003/0009490 A1 * | 1/2003 | Maeno ....................... 707/500 |
| 2003/0084078 A1 * | 5/2003 | Torii et al. .................. 707/513 |
| 2003/0110150 A1 * | 6/2003 | O'Neil et al. .................. 707/1 |
| 2004/0205470 A1 * | 10/2004 | Jones et al. ................. 715/500 |
| 2004/0205583 A1 * | 10/2004 | Jones et al. ................. 715/513 |
| 2005/0228791 A1 * | 10/2005 | Thusoo et al. ................. 707/6 |
| 2005/0246716 A1 * | 11/2005 | Smith et al. ................ 719/315 |

* cited by examiner

*Primary Examiner*—Stephen Hong
*Assistant Examiner*—Thu Huynh
(74) *Attorney, Agent, or Firm*—Staas & Halsey LLP

(57) ABSTRACT

The structured document converting method converts a tagged structured document in which tags are hierarchically ordered, into a document of unrestricted order, in such a manner that the original structured document can be restored. When converting a tagged structured document in which tags are hierarchically ordered into a document of unrestricted order, positional information relating to the original structured document is appended as attribute information to each tag. Furthermore, an index and hierarchical layer depth are used as references in the positional information. Moreover, a namespace is assigned.

18 Claims, 15 Drawing Sheets

XML DOCUMENT(REVISED)

```
<XSort:SortedDocument xmlns:XSort="http://xsort.fujitsu.com/">
  <Birthday  yy="1921"  mm="5"  dd="3"      XSort:Index="5" XSort:Depth="3"/>
  <PID num="534" XSort:Index="9" XSort:Depth="4"/>
  <Get0  XSort:Index="3" XSort:Depth="3" />
  <Get1  XSort:Index="4" XSort:Depth="3"/>
  <Remain XSort:Index="6" XSort:Depth="3"/>
  <TreeTop XSort:Index="1" XSort:Depth="1"/>
  <PersonalData XSort:Index="2" XSort:Depth="2"/>
  <OtherData XSort:Index="7" XSort:Depth="2"/>
  <Request XSort:Index="8" XSort:Depth="3"/>
</XSort:SortedDocument>
```

FIG. 4

XML DOCUMENT(ORIGINAL)

```
<TreeTop>
  <PersonalData>
    <Get0/>
    <Get1/>
    <Birthday yy="1921" mm="5" dd="3"/>
    <Remain/>
  </PersonalData>
  <OtherData>
    <Request>
      <PID num="534"/>
    </Request>
  </OtherData>
</TreeTop>
```

FIG. 5

XML DOCUMENT(REVISED)

```
<XSort:SortedDocument xmlns:XSort=http://xsort.fujitsu.com/">
  <Birthday yy="1921" mm="5" dd="3" XSort:Index="5" XSort:Depth="3"/>
  <PID num="534" XSort:Index="9" XSort:Depth="4"/>
  <Get0  XSort:Index="3" XSort:Depth="3" />
  <Get1  XSort:Index="4" XSort:Depth="3"/>
  <Remain XSort:Index="6" XSort:Depth="3"/>
  <TreeTop XSort:Index="1" XSort:Depth="1"/>
  <PersonalData XSort:Index="2" XSort:Depth="2"/>
  <OtherData XSort:Index="7" XSort:Depth="2"/>
  <Request XSort:Index="8" XSort:Depth="3"/>
</XSort:SortedDocument>
```

FIG. 6

XML DOCUMENT(REVISED)

```
<TreeTop>
  <PersonalData>
    <Get0/>
    <Get1/>
    <Birthday yy="1921" mm="5" dd="3"/>
    <Remain/>
  </PersonalData>
  <OtherData>
    <Request>
      <PID num="534"/>
    </Request>
  </OtherData>
</TreeTop>
```

FIG. 7

| PRIORITY ORDER | ELEMENT NAME |
|---|---|
| 1 | BirthDay |
| 2 | PID |
| 3 | Get0   Get1 |
| 4 | Remain |
| 5 | OTHERS |

FIG. 9

```
<Map LONGITUDE="E138.52" LATITUDE="N37.33">
  <ROAD MAP>
    <ROAD line="228.4 338.5 339.6 345.6 233.6......."/>
    <ROAD line="110.3 115.6 122.7 185.3 145.6........"/>
      :
  </ROAD MAP>
  <LANDMARK>
    <PUBLIC>
      <FACILITY name="○CITY OFFICE" x="103.4" y="99.2"/>
      <FACILITY name="○FIRE DEPARTMENT" x="121.2" y="223.2"/>
        :
    </PUBLIC>
    <AMUSEMENT>
      <FACILITY name="○BOWLING FACILITY" x="77.6" y="94.8"/>
      <AREA name="○PARK" x="45.1" y="75.4"/>
        :
    </AMUSEMENT>
      :
  </LANDMARK>
    :
</Map>
```

FIG. 10

```
<XSort:SortedDocument xmlns:XSort="http://xsort.fujitsu.com/">
 <Map LONGITUDE="E138.52" LATITUDE="N37.33" XSort:Index="1" XSort:Depth="1"/>
 <LANDMARK XSort:Index="86" XSort:Depth="2"/>
 <AMUSEMENT XSort:Index="101" XSort:Depth="3"/>
  <FACILITY name="○BOWLING FACILITY" x="77.6" y="94.8" XSort:Index="102" XSort:Depth="4"/>
  <FACILITY name="○PARK" x="45.1" y="75.4" XSort:Index="103" XSort:Depth="4"/>
 ...
 <PUBLIC XSort:Index="86" XSort:Depth="3"/>
  <FACILITY name="○CITY OFFICE" x="103.4" y="99.2" XSort:Index="87" XSort:Depth="4"/>
  <FACILITY name="○FIRE DEPARTMENT" x="121.2" y="223.2" XSort:Index="88" XSort:Depth="4"/>
 ...
 <ROAD MAP XSort:Index="2" XSort:Depth="2"/>
  <ROAD line="228.4 338.5 339.6 345.6 233.6........" XSort:Index="3" XSort:Depth="3"/>
  <ROAD line="110.3 115.6 122.7 185.3 145.6........" XSort:Index="4" XSort:Depth="3"/>
 ...
</XSort:SortedDocument>
```

FIG. 11

```
<XSort:SortedDocument xmlns:XSort="http://xsort.fujitsu.com/">
<Map LONGITUDE="E138.52" LATITUDE="N37.33" XSort:Index="1" XSort:Depth="1"/>
<ROAD MAP XSort:Index="2" XSort:Depth="2"/>
<ROAD line="228.4 338.5 339.6 345.6 233.6........." XSort:Index="3" XSort:Depth="3"/>
<ROAD line="110.3 115.6 122.7 185.3 145.6........." XSort:Index="4" XSort:Depth="3"/>
     ...
<LANDMARK XSort:Index="86" XSort:Depth="2"/>
<PUBLIC XSort:Index="86" XSort:Depth="3"/>
<FACILITY name="○CITY OFFICE" x="103.4" y="99.2" XSort:Index="87" XSort:Depth="4"/>
<FACILITY name="○FIRE DEPARTMENT" x="121.2" y="223.2" XSort:Index="88" XSort:Depth="4"/>
     ...
<AMUSEMENT XSort:Index="101" XSort:Depth="3"/>
<FACILITY name="○BOWLING FACILITY" x="77.6" y="94.8" XSort:Index="102" XSort:Depth="4"/>
<FACILITY name="○PARK" x="45.1" y="75.4" XSort:Index="103" XSort:Depth="4"/>
     ...
</XSort:SortedDocument>
```

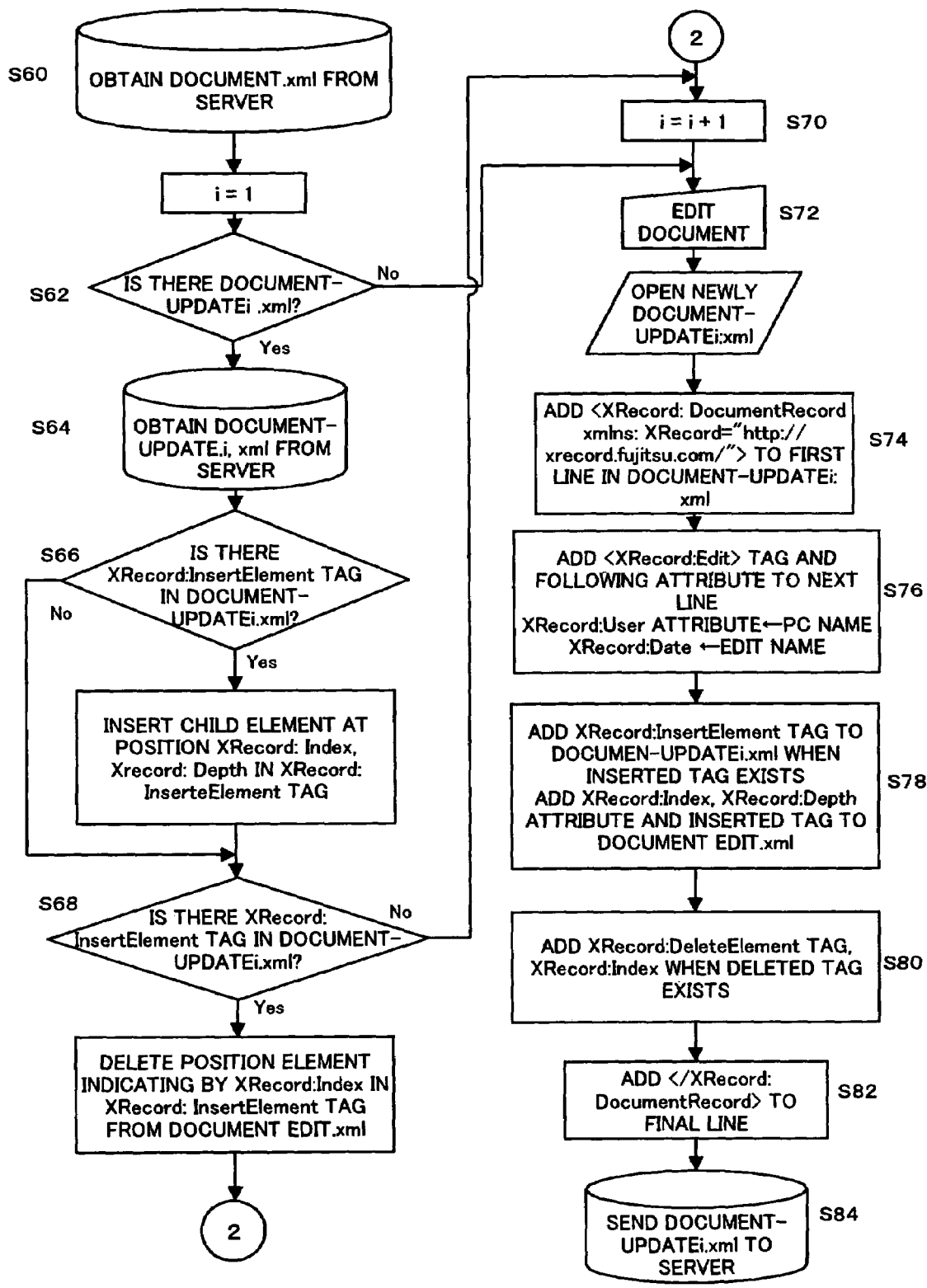

```
<XRecord: DocumentRecord  xmlns: XRecord ="http://xrecord.fujitsu.com/">
  < XRecord:Edit XRecord:User="PC2" XRecord:Date="2001/10/18" />
  < XRecord:InsertElement>
    <Color Type="Red" XRecord:Index="6" XRecord:Depth="3" />
  </XRecord:InsertElement>
</XRecord: DocumentRecord>
```

```
<XRecord: DocumentRecord  xmlns: XRecord ="http://xrecord.fujitsu.com/">
  < XRecord:Edit XRecord:User="PC1" XRecord:Date="2001/10/22" />
  < XRecord:DeleteElement XRecord:Index="3">
</XRecord: DocumentRecord>
```

```
<Document>
  <Title>ORIGINAL</Title>
    <Content>
    <Data> Positive </Data>
    <Color Type="Red"
  </Content>
</ Document>
```

STRUCTURED DOCUMENT CONVERTING METHOD, RESTORING METHOD, CONVERTING AND RESTORING METHOD, AND PROGRAM FOR SAME

BACKGROUND OF THE INVENTION

1. Field of the Invention

The present invention relates to a method for converting tags required for a structured document based on an original sequential list, such as XML (eXtensible Markup Language), in a re-constructable manner, and a method and program for restoring same, and more particularly, to a method for converting the order of a structured document into a structured document of unrestricted order, a method for restoring same, and a program for same.

2. Description of the Related Art

A markup method is used as a description language for data conversion. A markup method is a method whereby a mark (tag) is attached to elements, such as document titles, and document text, indicating what each element represents. A typical example is HTML (HyperText Markup Language) that is used for Web presentations. On the other hand, XML (extensible Markup Language) allows the user freely to set tags to be attached when describing information, and hence it has better generic adaptability.

For example, XML allows the attachment of tags determined independently by the user, such as <product> or <number of items>. Therefore, in XML, provided that the meaning of the tags has been determined, data can be extracted without the meanings of the individual elements described in the document being confused.

In a structured document format represented by XML, the document information is constructed logically by means of a method such as tag management, or the like. Therefore, electronic processing of the document can be performed efficiently. For example, provided that the tag meanings are known, this can be convenient for the reuse of data.

The basic composition of a structured document of this kind is a one-dimensional list of tags in hierarchical order, and it is possible to extract the necessary tag data by sort processing, or the like.

In processing a structured document of this kind, a problem arises in that when processing, such as sorting or editing of the original structured document, has been performed, the original structured document cannot be reconstructed on the basis of the processed structured document.

For example, in a document processing device wherein progressive information is received from a transfer source, such as a mobile terminal, even if the required information is a portion at the end of the structured document, it is only possible to receive the whole required document, by sort processing. However, the original structured document cannot be reconstructed from the received document, and if other information in the structured document is required, then the document must be received again.

Similarly, when editing the original structured document, it is necessary to store the edited structured document, and hence the management of the document history becomes complex and the volume of data stored increases.

SUMMARY OF THE INVENTION

Consequently, it is an object of the present invention to provide a structured document converting method and program for converting a structured document to a re-constructable format.

Furthermore, it is a further object of the present invention to provide a structured document converting method and program for achieving secondary use of a structured document, in a re-constructable manner.

Moreover, it is yet a further object of the present invention to provide a structured document converting method and program for reconstructing a structured document, even if the order of the structured document is converted to an unrestricted order.

Furthermore, it is yet a further object of the present invention to provide a structured document converting method and program for reconstructing-a structured document, even when required information of the structured document is transferred first.

Moreover, it is yet a further object of the present invention to provide a structured document converting method and program for facilitating history management, even if a structured document is processed.

In order to achieve the aforementioned objects, the structured document converting method according to the present invention is a method for converting a structured document comprising the steps of: dividing a structured document, which is composed of tagged documents listed sequentially and ordered hierarchically, into the tag units; adding positional information indicating a position in the structured document to the divided documents, and converting same into the tagged documents.

Furthermore, the structured document restoring method according to the present invention is a method for restoring a structured document, being a method for restoring converted tagged documents, comprising the steps of: rearranging the tagged documents in accordance with the positional information of the converted tagged documents, and deleting the positional information from the tagged documents.

The structured document converting and restoring method according to the present invention is a method for converting and restoring a structured document, comprising the steps of: dividing a structured document, which is composed of tagged documents listed sequentially and ordered hierarchically, into the tag units; adding positional information indicating a position in the structured document to the divided documents, and converting same into the tagged documents; rearranging the tagged documents in accordance with the positional information of the converted tagged documents; and restoring the structured document by deleting the positional information from the tagged documents.

Moreover, the structured document converting program according to the present invention is a program for converting a structured document, comprising: a program for dividing a structured document, which is composed of tagged documents listed sequentially and ordered hierarchically, into the tag units; and a program for adding positional information indicating a position in the structured document to the divided documents, and converting same into the tagged documents.

Furthermore, the structured document restoring program according to the present invention is a program for restoring converted tagged documents, comprising: a program for rearranging the tagged documents in accordance with the positional information of the converted tagged documents, and a program for deleting the positional information from the tagged documents.

Moreover, the structured document converting and restoring program according to the present invention comprises: a program for dividing a structured document, which is composed of tagged documents listed sequentially and ordered hierarchically, into the tag units; a program for adding positional information indicating a position in the structured document to the divided documents, and converting same into the tagged documents; a program for rearranging the tagged documents in accordance with the positional information of the converted tagged documents; and a program for deleting the positional information from the tagged documents.

In the present invention, when converting a tagged structured document in which tags are hierarchically ordered into a document with unrestricted order, positional information relating to the original structured document is appended as attribute information to each tag, and therefore in addition to being able to achieve an unrestricted order in the converted document, it is also possible to restore the converted document to the original structured document, in accordance with the positional information.

Furthermore, according to the present invention, desirably, the converting step comprises the step of adding the positional information as attribute information in the tag. Moreover, according to the present invention, the method for restoring converted tagged documents comprises the steps of: extracting the positional information from the converted tagged documents and rearranging the tagged documents in accordance with the positional information; and deleting the positional information from the tagged document.

In this feature of this invention, when converting a tagged structured document in which tags are hierarchically ordered into a document with unrestricted order, positional information relating to the original structured document is appended as attribute information to each tag, and therefore in addition to being able to achieve an unrestricted order in the converted document, it is also possible to restore the converted document to the original structured document, in accordance with the positional information.

Furthermore, according to the present invention, desirably, the converting step comprises a step of adding index and depth information for the documents by means of attribute values restricted by a namespace, and converting to a new structured document. Moreover, desirably, the restoring method of the present invention comprises the steps of: rearranging the tagged documents in the line direction of the document, in accordance with the indexes of the converted tagged documents, and ordering the tagged documents hierarchically, in accordance with the depth information of the tagged documents.

In this aspect of the invention, since the index and hierarchical layer depth are used as references in the positional information, it is possible to restore the original structured document easily. Furthermore, since a space name is assigned when the document is converted into a structured document, similar document processing is possible.

Moreover, desirably, the conversion method of the present invention further comprises a step of transferring the tagged documents in a specified priority order. Thus, it is possible to transfer a structured document of a large volume starting from a desired location, whilst also being able to restore the structured document.

Furthermore, in the restoring method of the present invention, the dividing step comprises a step of extracting differential information relating to an original structured document and an updated structured document, and dividing same into the tag units. Thereby, management and updating of the structured document is facilitated and the storage volume can be reduced.

BRIEF DESCRIPTION OF THE DRAWINGS

FIG. 4 is a compositional diagram of the XML document (original) in FIG. 1;

FIG. 5 is a compositional diagram of the XML document (converted) in FIG. 1;

FIG. 6 is a compositional diagram of the XML document (restored) in FIG. 1;

FIG. 7 is an illustrative diagram of the priority order table in FIG. 1;

FIG. 9 is an illustrative diagram of an XML document of the map database in FIG. 8;

FIG. 10 is an illustrative diagram of a first converted XML document from FIG. 8;

FIG. 11 is an illustrative diagram of a second converted XML document from FIG. 8;

FIG. 18 is a flow diagram of edit processing of the document in FIG. 14;

FIG. 19 is an illustrative diagram of an update of an XML document in the case of insert editing of the document in FIG. 18;

FIG. 20 is an illustrative diagram of an update of an XML document in the case of delete editing of the document in FIG. 18; and FIG. 21 is an illustrative diagram of a logical XML document updated according to FIG. 19 and FIG. 20.

DESCRIPTION OF THE PREFERRED EMBODIMENTS

Below, embodiments of the present invention are described in terms of a structured document converting and restoring method, a first embodiment, second embodiment and other embodiments, but the present invention is not limited to the following embodiments.

[Structured Document Converting and Restoring Method]

Figure 1:
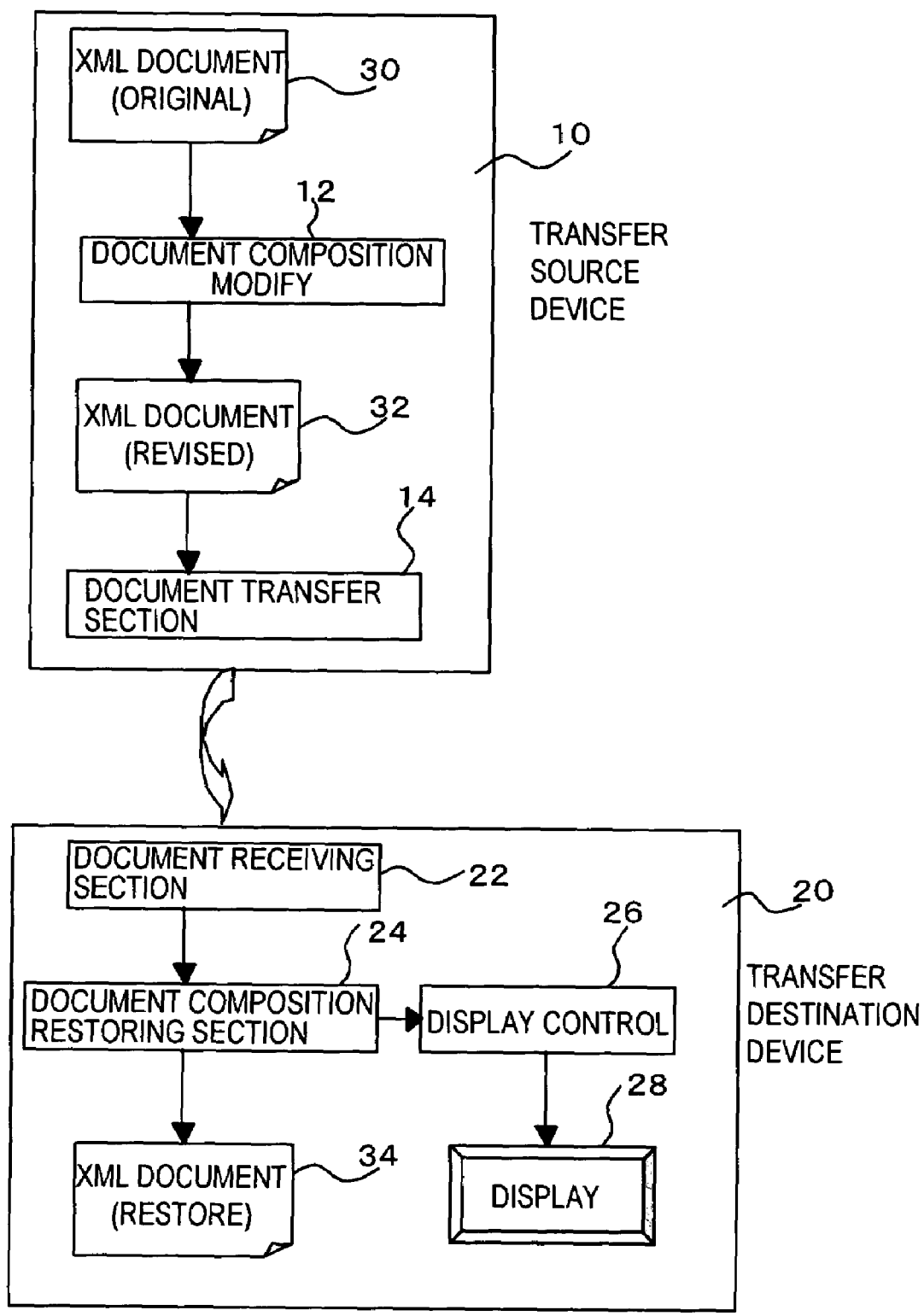
FIG. 1 is a compositional diagram of the structured document converting and restoring system according to an embodiment of the present invention.
Figure 2:
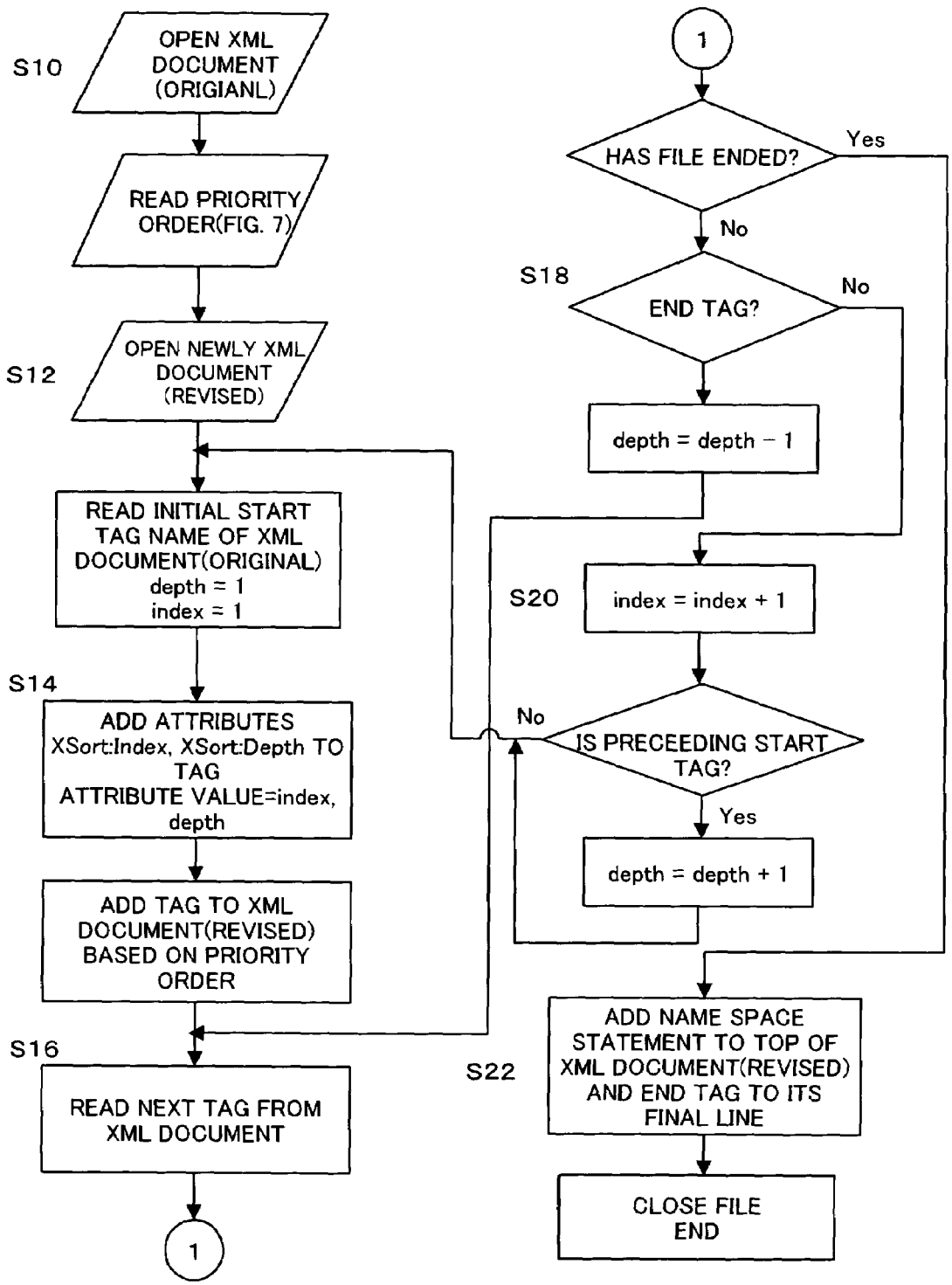
FIG. 2 is a conversion processing flow diagram of the structured document in FIG. 1.
Figure 3:
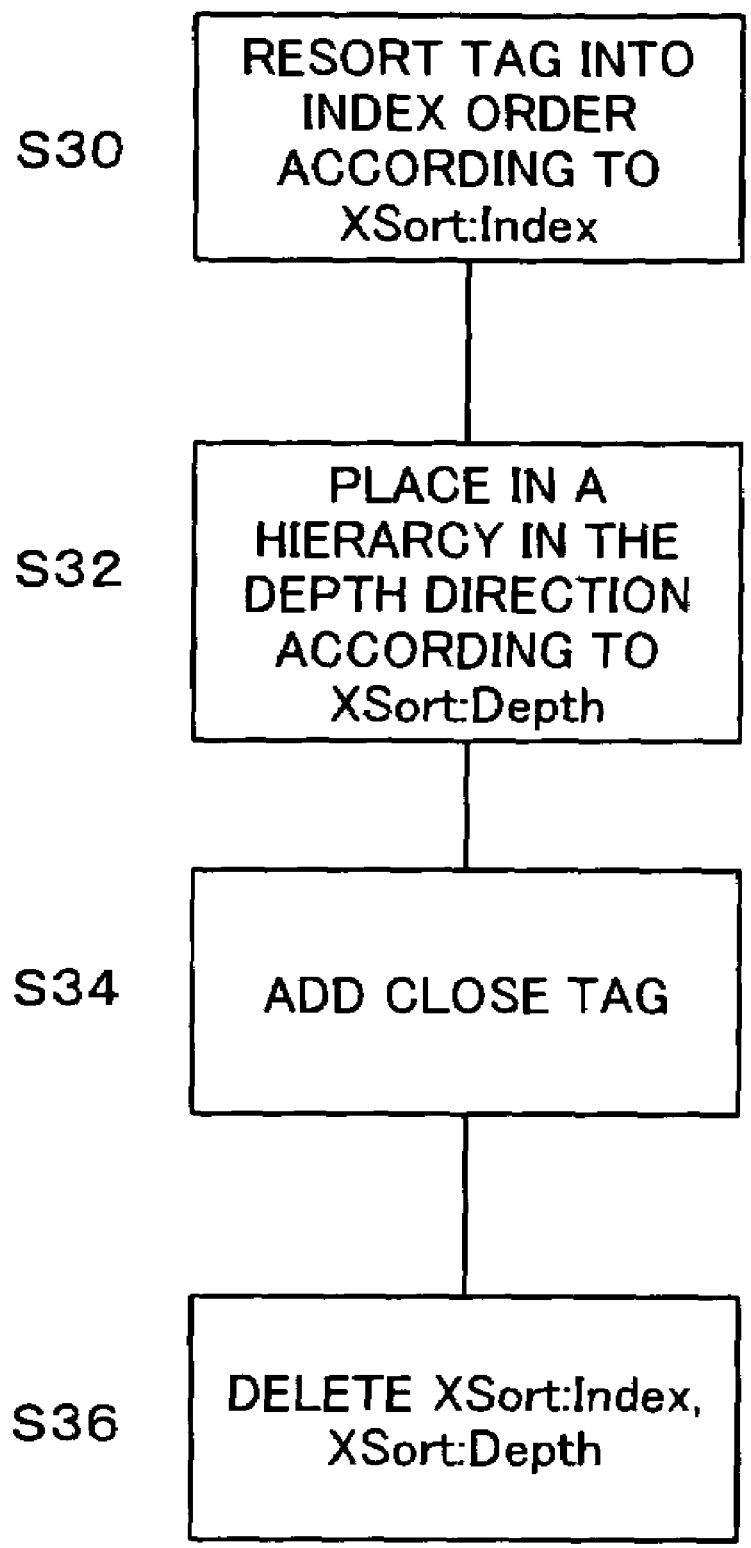
FIG. 3 is a restore processing flow diagram of the structured document in FIG. 1.

FIG. 1 is a compositional diagram of a structured document converting and restoring system according to the present invention; FIG. 2 is a processing flow diagram of a structured document composition converting section; FIG. 3 is a restoring process flow diagram of the structured document composition restoring section in FIG. 1; FIG. 4 is an illustrative diagram of the XML document (original) in FIG. 1; FIG. 5 is an illustrative diagram of a converted XML document; FIG. 6 is an illustrative diagram of a restored XML document; and FIG. 7 is an illustrative diagram of the priority order table used in FIG. 1.

FIG. 1 shows a system for converting a structured document at a transfer source, sending same to a transfer destination, and restoring the structured document at the transfer destination. As shown in FIG. 1, the transfer source device 10 comprises a document composition modifying section 12 and document transfer section 14, and the transfer destination device 20 comprises a document receiving section 22, a document composition restoring section 24, a document display section 26, and a display device 28.

The document composition modifying section 12 reads in the XML document (original) illustrated in FIG. 4 and divides the document into element tag block units. The document composition modifying section 12 then determines the transfer order for the blocks, in the priority sequence shown in FIG. 7, and for each block, adds an index and depth information according to attribute values (XSort:Index, XSort:Depth) restricted by the dedicated namespace indicating the sequence information (xmlns:XSort=HYPERLINK "http://xsort.fujitsu.com/" http://xsort.fujitsu.com/), thereby constructing a new XML document (revised document) as indicated in FIG. 5.

The XML document (revised) in FIG. 5 is transferred sequentially by the document transfer section 14 to the document receiving section 22 of the transfer destination device 20. The document composition restoring section 24 transfers the received blocks sequentially to the document display section 26, where they are displayed on a display device 28, and the blocks are also reconstructed as an XML document (restored), as illustrated in FIG. 6, on the basis of the attribute values of the index and depth information of the XML document (revised).

The document composition modifying processing is now described with reference to FIG. 2, FIG. 4 and FIG. 5. Firstly, the composition of the XML document is described. FIG. 4 shows an XML document (structured document) wherein personal data is described. The XML document is a structured document in which hierarchically sorted tags are listed sequentially, and in FIG. 4, the hierarchy is higher towards the left-hand side and lower towards the right-hand side.

In FIG. 4, the personal data and other data are described between the <TreeTop> start tag and the </TreeTop> end tag. The personal data is listed between the <PersonalData> start tag and the </PersonalData> end tag, and in this example, the stated data is: <Get0/>, <Get1/>, <Birthday yy="1921" mm="5" dd="3"/>, <Remain/>. Here the "/" symbol indicates the end of the tags of that hierarchical layer.

Similarly, the other data is listed between the <OtherData> start tag and the </OtherData> end tag, and in this example, the stated data is: <Request>, <PID num="534"/>, </Request>.

Next, document composition modification processing is described in accordance with FIG. 2.

(S10) The XML document (original) is opened. Here, to reorder the respective tags according to the priority order table, the priority order table in FIG. 7 is read out. This priority order table corresponds to the content sequence of the XML document in FIG. 4, and the element names are stated in order starting from the priority order number 1. For example, in FIG. 7, the priority order is "Birthday", "PID", "Get0 Get1", "Remain", "Other".

(S12) Next, a new XML document (revised) is opened. The initial start tag name of the XML document (original) is read. Thereupon, the depth value, depth, and the index value, index, are set to "1".

(S14) The attributes XSort:Index, XSort:Depth are added to the tag. These attributes are the index value, index, and the depth value, depth. The priority order table in FIG. 7 and the tag name are compared. The tags are added to the XML document (revised) on the basis of the priority order. In other words, the tags which are higher in the priority order are added first to the document.

(S16) The next tag is read out from the XML document (original). It is determined from the next tag is the file has ended. In FIG. 4, when the tag is </Tree>, then it is judged that this is the end of the file. At the end of the file, the procedure goes to step S22.

(S18) If the file has not finished, then it is determined whether the read tag is an end tag containing a "/". If the tag is an end tag, then the depth value, depth, is changed to "depth—1", and the procedure returns to step S16.

(S20) If the tag is judged not to be an end tag, then the index value, index, is incremented by "1". Thereupon, it is judged whether the tag immediately preceding the read tag is a start tag. If this tag is judged not to be a start tag, then the procedure returns to step S14. On the other hand, if it is judged to be a start tag, then the depth value, depth, is incremented by "1", and the procedure returns to step S14.

(S22) Next, the aforementioned namespace statement is added to the header of the XML document (revised), an end tag is added to the final line, and the file is closed, thereby ending the document modification processing.

A specific example is described now with reference to FIG. 4, FIG. 5 and FIG. 7. An example is described wherein the XML document (original) in FIG. 4 is reordered according to the priority order table in FIG. 7. As shown in FIG. 5, since "Birthday" has the highest priority, the "Birthday" tag in FIG. 4 is added to the header position, and the positional information XSort:Index="5", XSort:Depth="3" is added into that tag. As shown in FIG. 4, the "Birthday" tag is on the fifth line from the top, and the third column from the left-hand edge, and therefore the positional information, XSort:Index="5", XSort:Depth="3" is added.

Similarly, "PID", which has the next priority order, is added in the next position, with the positional information XSort:Index="9", XSort:Depth="4" added to the "PID" tag. Thereafter, the "Get0", "Get1" and "Remain" tags are added together with the positional information, and the remaining tags of the elements of lower priority order are added in sequential positions in the XML document (original), together with the respective positional information.

Thereupon, as shown in FIG. 5, a namespace (xmlns:XSort=HYPERLINK "http://xsort.fujitsu.com/" http://xsort.fujitsu.com/) indicating the prioritised information is added to the header of the XML document (revised), and in the final line, the end tag (/XSort:SortedDocument> is added.

The document transfer section 14 sends XML document (revised) thus sorted into priority order to the transfer destination device 20. In the transfer destination device 20, the document receiving section 22 receives the XML document (revised), and transfers it to the document composition restoring section 24. The document composition restoring section 24 sends the received XML document (revised) to the display control device 26, in the order in which it is received. Consequently, the XML document (revised) is displayed sequentially, in positional order, on the display device 28.

In other words, the element with the highest priority is displayed first, and hence element tags with higher priority can be obtained more quickly, regardless of the position of the sequential element tags in the XML document (original).

On the other hand, the document composition restoring section 24 restores the received XML document (revised) shown in FIG. 5 into the XML document (original) shown in FIG. 6, in accordance with the restore processing flow in FIG. 3. Next, the restore processing flow in FIG. 3 is explained.

(S30) The respective elements tags of the XML document (revised) are read in, and the tags are resorted into index order, according to the XSort:Index value in the positional information in the tag.

(S32) Thereupon, the tags resorted into index order are placed in a hierarchy, in the depth direction, according to the XSort:Depth value in the positional information in the tag.

(S34) A close (end) tag is appended to each tag. In FIG. 6, the end tags are </Personal Data> for the personal data, </Request>, </OtherData>, </TreeTop>.

(S36) Finally, the positional information, XSort:Index, XSort:Depth, in each tag is deleted from the tags.

By so doing, the XML document (original) illustrated in FIG. 4 can be restored, as shown in FIG. 6. This restore processing can be performed during reception by the transfer destination device 20, or it may also be performed when required by the transfer destination device 20, after receiving the XML document (revised) and storing it in a memory. Moreover, the priority order may be specified by the transfer destination device 20, or conversely, it may be specified by the transfer source device 10.

In this way, when a tagged structured document in which tags are sorted in hierarchical order is converted into a document of unrestricted order, since the positional information in the original structured document is appended as attribute information to each tag, then in addition to changing to an unrestricted order in the converted document, it is also possible to restore the original structured document, in accordance with the positional information.

Moreover, since index and hierarchical layer depth are taken as references in the positional information, the original structured document can be restored easily. Furthermore, since a namespace is attached when converting to a structured document, similar document processing can be performed readily.

First Embodiment

Figure 8:
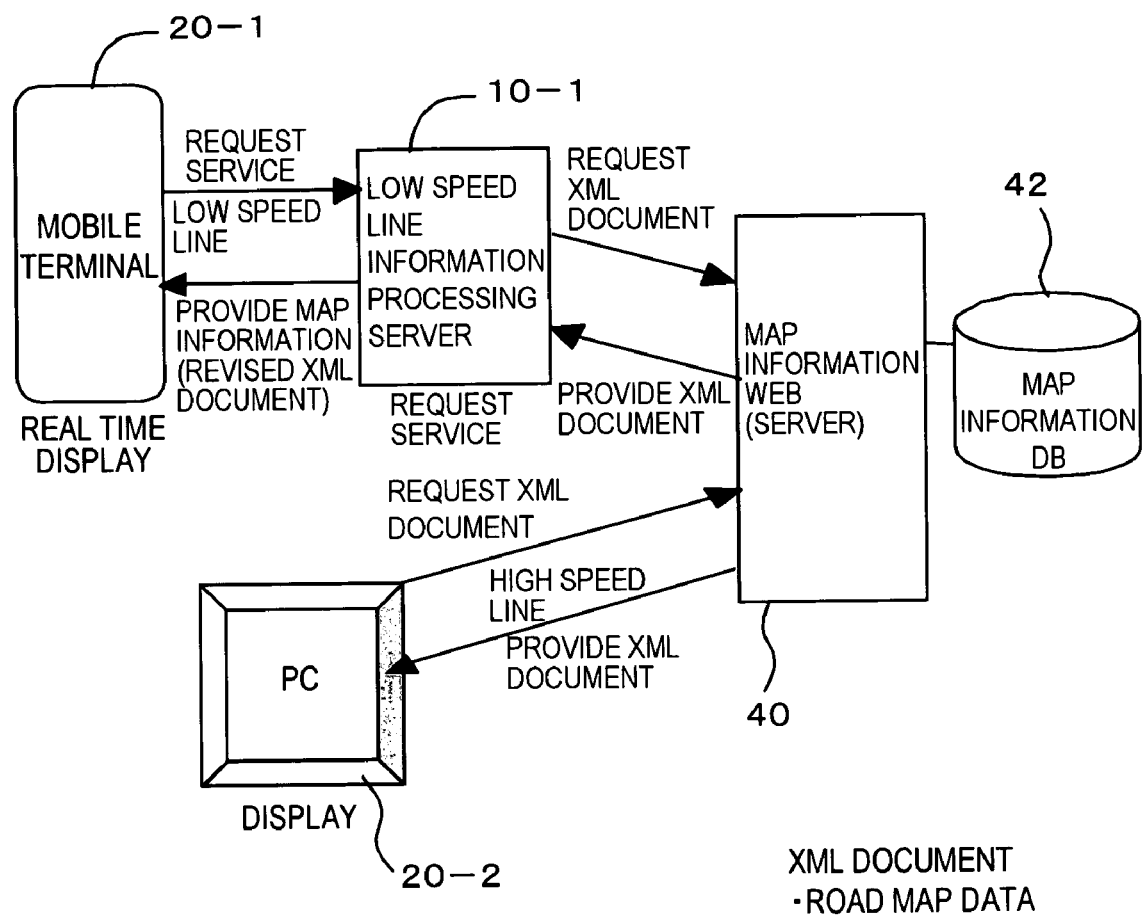
FIG. 8 is a compositional diagram of a system according to a first embodiment of the present invention.
Figure 12:
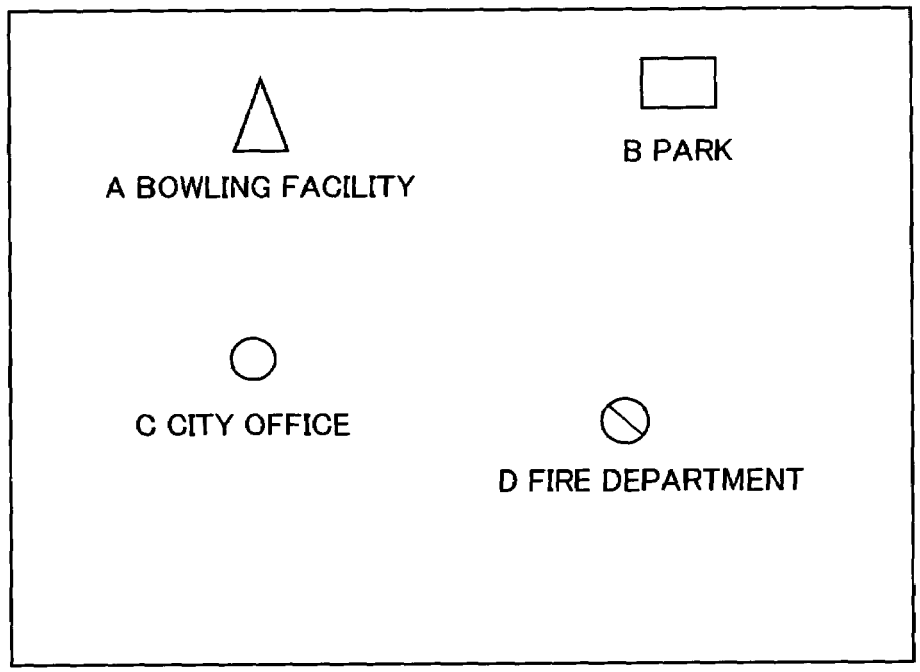
FIG. 12 is an illustrative diagram of a screen display of the first XML document in FIG. 10.
Figure 13:
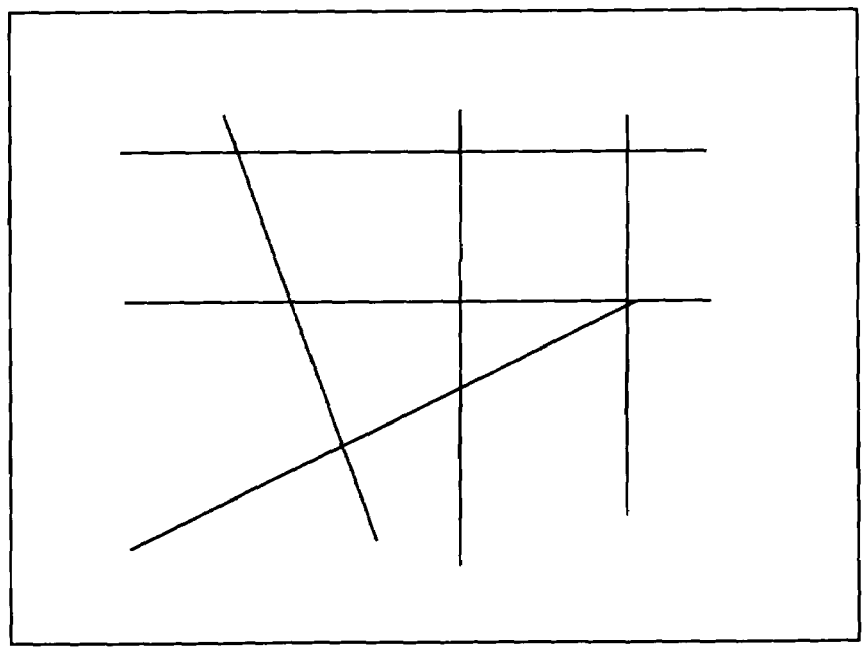
FIG. 13 is an illustrative diagram of a screen display of the second XML document in FIG. 11.

FIG. 8 is a system composition diagram of a first embodiment showing an example of the application of the structured document converting and restoring method according to the present invention; FIG. 9 is an illustrative diagram of a map database; FIG. 10 is an illustrative diagram of a converted first XML document; FIG. 11 is an illustrative diagram of a converted second XML document; FIG. 12 is an illustrative diagram of a real-time screen of a mobile terminal according to FIG. 10; and FIG. 13 is an illustrative diagram of a real-time screen of a mobile terminal according to FIG. 11.

FIG. 8 shows a map database searching system, wherein a map information database file 42 is registered containing map information for respective geographical regions in an XML document format. A map information Web (server) 40 searches the map information database 42, as desired, according to longitude and latitude co-ordinates, a map scale, or the like, and supplies a document.

Furthermore, upon receiving a request command for an XML document containing map information, in addition to longitude and latitude co-ordinates, a map scale, and the like, from a terminal 20-1, 20-2, the map information Web 40 provides a corresponding document from the map information database 42.

A low-speed line information processing service (server) 10-1 processes the XML document received from the map information Web 40 in accordance with a priority order request from the terminal 20-1, and it sends the new, processed XML document immediately to the terminal 20-1.

The mobile terminal (PDA, portable telephone, or the like) 20-1 is installed with an application which requests map information by inputting a longitude and latitude, and map scale, and then displays the received, processed XML document in real time (without waiting for the end of the document). The terminal 20-2 is, for example, constituted by a personal computer and requests an XML document from the map information Web 40, and receives a supplied XML document from same, by means of a high-speed line.

FIG. 9 is an illustrative diagram of an XML document in a map information database, wherein map information for longitude 138.52° East and latitude 37.33° North is registered in XML document format. Here, a road map and landmarks (city council building, parks, etc.) are indicated, by their name and longitude and latitude, and are registered in a tagged format.

In this case, it is assumed that the mobile terminal 20-1 has requested map information from the low-speed line information processing server 10-1, by selecting the current position (here assumed to be 138.52° East and latitude 37.33° North). The map information Web 40 searches for the corresponding XML document from the map information database 42, via the processing service 10-1, and supplies this XML document to the processing service 10-1. In this example, the XML document that is found and supplied has the contents illustrated in FIG. 9.

Here, if the user of the mobile terminal 20-1 is searching for baseball field A as a target location, and has entered the information "landmark—amusement facilities priority" to the processing service 10-1, along with the longitude and latitude and map scale, when making the information request, then the processing service 10-1 convert the supplied XML document (original) into an XML document (revised), in accordance with the conversion processing illustrated in FIG. 2.

As shown in FIG. 10, in the processed XML document, each element is appended with two attributes, XSort:Index and XSort:Depth, which are restricted by the namespace "xmlns:XSort=HYPERLINK "http://xsort.fujitsu.com/" http://xsort.fujitsu.com/". XSort:Index indicates the position of the respective elements in the original document and XSort:Depth indicates the depth at which that element is nested.

According to the priority order request from the terminal 20-1, the processing service 10-1 resorts the elements in such a manner that the information for landmarks, and within these, the information for amusement facilities, is listed first, and it appends an XSort:Index and XSort:Depth attribute to each element.

The processed XML document thus generated is sent in progressive fashion from the processing service 10-1 to the mobile terminal 20-1 via the low-speed line. At the mobile terminal 20-1, the installed application sequentially analyses each element received and displays analysed result in real time on a screen. In this case, the amusement facilities (bowling centre, etc.) are prioritised in the display, as illustrated in the screen example in FIG. 12.

Next, at the stage where one set of amusement facilities has been displayed, the user checks that the desired baseball field A is not contained in the information screen. In this case, the user does not have to wait for the whole document to be displayed, but rather, he or she can specify new co-ordinates information (by using a scroll function, or the like), to request provision of other map information.

Next, it is supposed that the user wishes to use this service in order to travel in the right direction. Here, the XML document in FIG. 9 is subjected to document composition conversion processing in a similar manner by the processing service 10-1, and is reconstructed as shown in FIG. 11 and sent to the terminal.

In FIG. 11, in the processed XML document, the elements are appended with the two attributes XSort:Index and XSort:Depth which are restricted by the namespace "xmlns:XSort=HYPERLINK "http://xsort.fujitsu.com/" http://xsort.fujitsu.com/". XSort:Index indicates the position of the respective elements in the original document and XSort:Depth indicates the depth at which that element is nested.

According to the priority order request from the terminal 20-1, the processing service 10-1 resorts the elements in such a manner that the roadmap information is listed first, and it appends an XSort:Index and XSort:Depth attribute to each element.

The processed XML document thus generated is sent in progressive fashion from the processing service 10-1 to the mobile terminal 20-1 via the low-speed circuit. At the mobile terminal 20-1, the installed application sequentially analyses each element received and displays the analysed result in real time on a screen. In this case, the roads are prioritised in the display, as illustrated in the screen example in FIG. 13.

Here, since the roads are displayed first on the basis of the co-ordinates information of the road map, the user is able to ascertain the road locations without having to wait for the whole screen to be displayed. The processed XML document is stored in the memory of the mobile terminal 20-1 and can be restored to the original XML document (in this case, the map information for a specific location), as and when required.

In this way, by previously specifying the priority order of the information required by the user, it is possible to use XML information of a relatively large size in an efficient manner, by transferring the information in priority order.

Second Embodiment

Next, a description is given of an example of application to a document archive and history management server, whereby history management is facilitated and storage volume is reduced in relation to the editing of XML documents.

Figure 14:
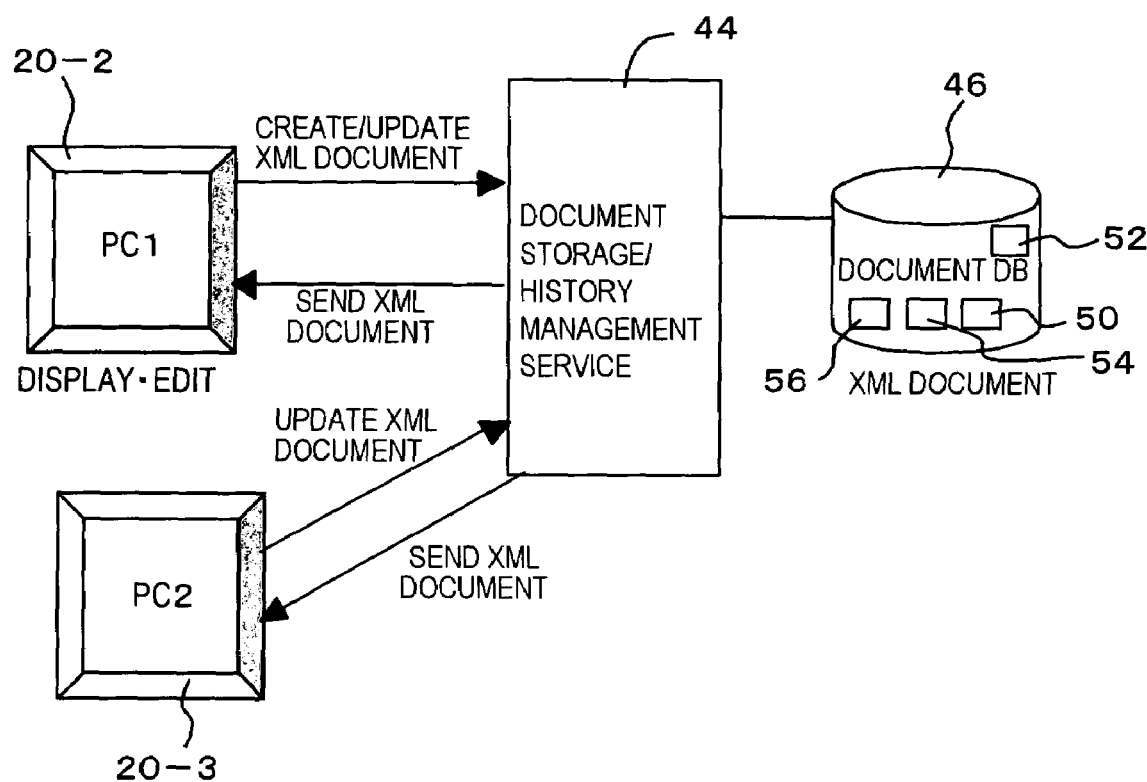
FIG. 14 is a compositional diagram of a system according to a second embodiment of the present invention.
Figure 15:
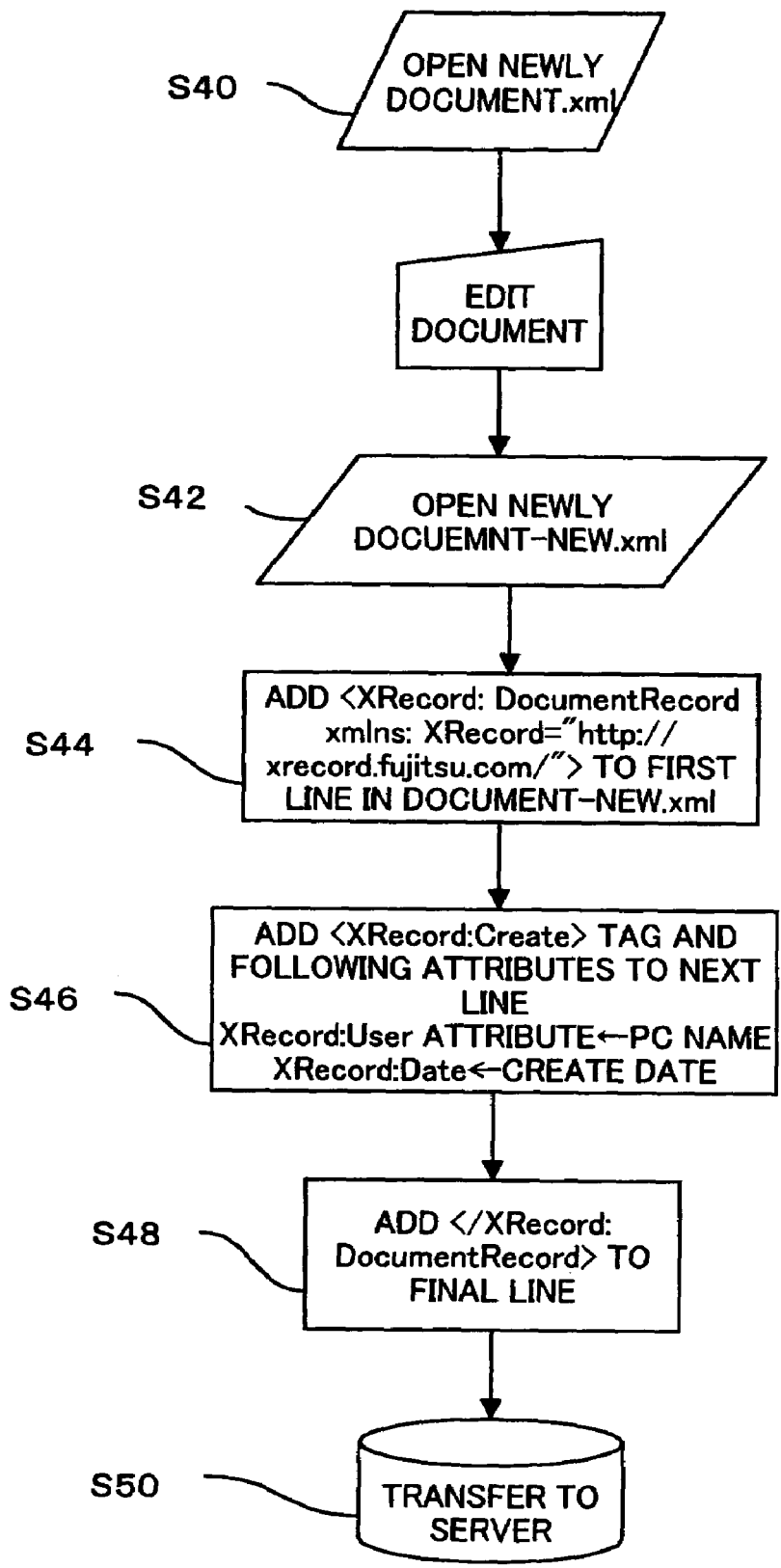
FIG. 15 is a flow diagram of the new document creating processing in FIG. 14.
Figure 16:
FIG. 16 is an illustrative diagram of the XML document in FIG. 15.
Figure 17:
FIG. 17 is an illustrative diagram of an update of an XML document in FIG. 15.

FIG. 14 is a system composition diagram of a second embodiment of the present invention; FIG. 15 is a flow diagram of the document creation processing in FIG. 14; FIG. 16 is an illustrative diagram of an XML document created by the processing in FIG. 15; FIG. 17 is an update status document for an XML document; FIG. 18 is a flow diagram of the document update processing in FIG. 14; FIG. 19 is an illustrative diagram of the updated document created in FIG. 18; FIG. 20 is an illustrative diagram of a further updated document created in FIG. 18; and FIG. 21 is an illustrative diagram of an updated XML document.

As shown in FIG. 14, the document database file 46 stores documents in XML document format. A document archive and history management service server 44 is able to search for the document database file 46 as desired. The document archive and history management service server 44 can be accessed from any of the terminals 20-2, 20-3, and has a function whereby an XML document can be obtained from the document database 46 and stored, in accordance with a create or edit request from the terminal 20-2, 20-3. Moreover, the terminal 20-2, 20-3 is constituted by a personal computer (PC).

The new document creation and registration processing implemented in the terminal is now described in accordance with FIG. 15, and with reference to FIG. 16 and FIG. 17.

(S40) Firstly, a new document, document.xml, is opened by the terminal 20-2, and document editing is performed. FIG. 16 shows an example of the edited (created) XML document.

(S42) Thereupon, a new document, "document-new.xml", defining the attributes of the newly created XML document is opened.

(S44) As shown in FIG. 17, document-new.xml indicates the update status of document.xml, and the statement <XRecord: DocumentRecord xmlns:XRecord=HYPERLINK "http://xrecord.fujitsu.com/" http://xrecord.fujitsu.com/"> is written to the first line of document-new.xml. Consequently, the update information is managed by elements and attributes restricted by the namespace xmlns:XRecord=HYPERLINK "http://xrecord.fujitsu.com/" http://xrecord.fujitsu.com/".

(S46) On the next line, an <XRecord:Create> tag is added, along with the XRecord=User attribute PC name, and XRecord:Date=Date created. Here, the element XRecord:Create represents information indicating that a new document has been created, the attribute XRecord:User indicates the creator, and the attribute XRecord:Date indicates the date the document was created.

(S48) Moreover, an end tag, </XRecord:DocumentRecord>, is appended to the last line.

(S50) Document.xml, and document-new.xml are transferred from the terminal 20-2 to the document archive and history management service server 44. The server 44 stores document.xml 50 and document-new.xml 52 in the document database 46.

Next, a case is described wherein the terminal 20-3 (or 20-2) edits (inserts or deletes entries to) document.xml which has been stored using the service. The XML document editing processing by the terminal shall be described according to FIG. 18, with reference to FIGS. 19 through 21, (S60) The terminal obtains document.xml that is to be edited, from the server 44, and sets it as document-edit.xml in its internal memory. A pointer, i, for the number of updated documents, is initialized to a value of "1".

(S62) An enquiry is made to see whether there exists a document-update-i.xml in the server 44. If there is no such document, then the procedure advances to step S72.

(S64) If there is a document-update-i.xml, then this document-update-i.xml is obtained from the server 44. FIG. 19 shows the document-update-i.xml created when a document portion is added, and FIG. 20 shows the document-update-i.xml created when a portion of the document is deleted. The example shown in FIG. 19 is a document-update-i.xml in a case where the statement <Color Type="Red"/> has been inserted after the Data element of the XML document in FIG. 16. In FIG. 19, XRecord:InsertElement indicates that the element contained therein is to be inserted at the location indicated by the position XRecord:Index and the nesting depth XRecord:Depth.

Moreover, FIG. 20 shows an example of a document-update-2.xml in a case where the PC1 has deleted the <SubTitle> element of the XML document in FIG. 16. In FIG. 20, XRecord:DeleteElement indicates that the element corresponding to the attribute XRecord:Index="3" is to be deleted from each sub-tree.

(S66) The terminal determines whether or not the obtained document-update-i.xml contains an XRecord:InsertElement tag. If there is no such tag, then the procedure advances to step S68. If there is an XRecord:InsertElement tag, as corresponds to the case of FIG. 19, then the position indicated by the subsidiary element XRecord:Index, XRecord:Depth of the XRecord:InsertElement tag, a subsidiary element stripped of these attributes deleted is inserted into the document-edit.xml from step S60.

(S68) The terminal determines whether or not the obtained document-update-i.xml contains an XRecord:DeleteElement tag. If there is no such tag, then the procedure advances to step S70. If there is an XRecord:DeleteElement tag, as corresponds to the case of FIG. 20, then the element at the position represented by the subsidiary element XRecord:Index of the XRecord:DeleteElement tag is deleted from the document-edit.xml from step S60. In this way, the updated document is restored from the XML document (original) and the differential update document.

(S70) The update pointer, i, is incremented by "1".

(S72) Document editing is performed on document-edit.xml. Thereupon, a new file, document-new-i.xml defining the attributes of the edited XML document is newly opened.

(S74) As shown in FIG. 19 and FIG. 22, document-new-i.xml represents the update status of document.xml, and the statement <XRecord: DocumentRecord xmlns: XRecord=HYPERLINK "http://xrecord.fujitsu.com/" http://xrecord.fujitsu.com/"> is written to the first line of document-new-i.xml. Consequently, the update information is managed by elements and attributes restricted by the namespace xmlns:XRecord=HYPERLINK ""http://xrecord.fujitsu.com/" http://xrecord.fujitsu.com/".

(S76) On the next line, an <XRecord:Edit> tag is added, along with the XRecord=User attribute PC name, and XRecord:Date=Date created. Here, the element XRecord:Edit represents information indicating that a new document has been created, the attribute XRecord:User indicates the creator, and the attribute XRecord:Date indicates the date the document was created.

(S78) If there is a tag that has been inserted in document-edit.xml, then an XRecord:InsertElement tag is added to document-update-i.xml and the inserted element is added as a subsidiary element together with the position XRecord:Index and nesting depth XRecord:Depth attributes.

(S80) Moreover, if there is a tag that has been deleted in document-edit.xml, then an XRecord:DeleteElement tag is added to document-update-i.xml, together with the attribute XRecord:Index indicating the position from which the tag is to be deleted.

(S82) Moreover, an end tag, </XRecord:DocumentRecord>, is appended to the last line.

(S84) Document-update-i.xml is transferred from the terminal 20-3 to the document archive and history management service server 44. The server 44 stores document-update-i.xml 54, 56 in the document database 46.

In logic terms, the document.xml updated in the above manner will be as illustrated in FIG. 21.

Even if only differential information for an XML document after editing is stored as update information with respect to an original XML document 50, since positional information is appended to the update information, the updated XML document can readily be reconstructed. Moreover, the edited XML document does not need to be saved, and hence document history management is facilitated, and storage space can be reduced. Therefore, it is possible to construct a low-cost history management service using a generic database for XML files, and exchange application.

OTHER EMBODIMENTS

In the second embodiment described above, an update document-i.xml is created by the terminal, but it is also possible for an update document-i.xml to be created by the server 44, in a similar manner. Moreover, although the namespace was used as logic information for automatic conversion, it is also possible to use information stipulating the document model, such as DTD, Schema, or the like.

In the foregoing, the present invention was described by means of embodiments, various modifications are possible within the scope of the present invention, and such modifications are not excluded from the technical scope of the present invention.

In such a way, when converting a tagged structured document in which tags are ordered hierarchically into a document with an unrestricted order, positional information relating to the original structured document is appended to each tag as attribute information, and hence, in addition to being able to achieve an unrestricted order in the converted document, it is also possible to restore the converted document to the original structured document, in accordance with the positional information.

Moreover, since the index and hierarchical layer depth are taken as references in the positional information, the original structured document can be restored easily. Moreover, since a namespace is appended when converting to a structured document, it is possible to perform similar document processing.

What is claimed is:

1. A method for converting a structured document comprising:
    dividing, by a computer, a structured document in XML format, which is composed of tagged documents listed sequentially and ordered hierarchically, by tags, in a file; and
    converting said structured document into tagged documents that added positional information comprising an index indicating an order of a respective tagged document in the structured document and a depth of the respective tagged document defined by the XML structured document format in said structured document,
    wherein said converting comprises converting the structured document into a new structured document in XML format by adding said index and said depth information as attribute values restricted by a namespace so that the structured document can be restored.

2. The method for converting a structured document according to claim 1, further comprising transferring said tagged documents in a designated priority order.

3. The method for converting a structured document according to claim 1, wherein said dividing comprises extracting differential information relating to an original structured document and an updated structured document, and dividing the structured document by said tags.

4. A method for restoring tagged documents converted according to claim 1, comprising:
   rearranging said tagged documents in accordance with said added positional information of said converted tagged documents; and
   deleting said positional information from said tagged documents to restore said original structured document in XML format.

5. A method for converting a structured document comprising:
   dividing, by a computer, a structured document in XML format, which is composed of tagged documents listed sequentially and ordered hierarchically, by tags, in a file; and
   converting said structured document into tagged documents in XML format that added positional information comprising an index indicating an order of a respective tagged document in the structured document and a depth of the respective tagged document defined by the XML structured document format in said structured document,
   wherein said converting comprises adding said positional information as attribute information in respective tags so that the structured document can be restored.

6. The method for converting a structured document according to claim 5, wherein said converting comprises converting the structured document into a new structured document that added the index and the depth information for said tagged documents as attribute values restricted by a namespace.

7. A method for restoring a structured document converted according to claim 6, comprising:
   rearranging said tagged documents in a line direction of the structured document, in accordance with said indexes of said converted tagged documents; and
   ordering said tagged documents hierarchically, in accordance with said depth information of said tagged documents to restore said original structured document in XML format.

8. A method for restoring tagged documents converted according to claim 5, comprising:
   extracting said added positional information from said converted tagged documents and rearranging said tagged documents in accordance with said added positional information; and
   deleting said positional information from said tagged documents to restore said original structured document in XML format.

9. A method for converting and restoring a structured document in XML format, comprising:
   dividing, by a computer, a structured document in XML format, which is composed of tagged documents listed sequentially and ordered hierarchically, by tags, in a file;
   converting said structured document into tagged documents that added positional information comprising an index indicating an order of a respective tagged document in the structured document and a depth of the respective tagged document defined by the XML structured document format in said structured document;
   rearranging said tagged documents in accordance with said added positional information of said converted tagged documents; and
   restoring said structured document in XML format by deleting said positional information from said tagged documents,
   wherein said converting comprises converting the structured document into a new structured document in XML format by adding said index and said depth information as attribute values restricted by a namespace.

10. The method for converting and restoring a structured document according to claim 9, further comprising transferring said tagged documents in a designated priority order.

11. The method for converting and restoring a structured document according to claim 9, wherein said dividing comprises extracting differential information relating to an original structured document and an updated structured document, and dividing the document by said tags; and said restoring comprises editing said tagged documents in accordance with the positional information of said converted tagged documents in said original structured document.

12. A method for converting and restoring a structured document, comprising:
   dividing a structured document in XML format, which is composed of tagged documents listed sequentially and ordered hierarchically, by tags, in a file;
   converting said structured document into tagged documents that added positional information comprising an index indicating an order of a tagged document in the structured document and a depth of the tagged document defined by the XML structured document format in said structured document,
   rearranging said tagged documents in accordance with said added positional information of said converted tagged documents; and
   restoring said structured document in XML format by deleting said positional information from said tagged documents,
   wherein said converting comprises adding said positional information as attribute information in respective tags.

13. The method for converting and restoring a structured document according to claim 12, wherein said converting comprises converting to a new structured document that added index and depth information for said documents as attribute values restricted by a namespace.

14. The method for converting and restoring a structured document according to claim 13, comprising:
   resorting said tagged documents in a line direction of the structured document, in accordance with said indexes of said converted tagged documents; and
   ordering said tagged documents hierarchically, in accordance with said depth information of said tagged documents to restore said original structured document in XML format.

15. The method for converting and restoring a structured document according to claim 12, wherein said restoring further comprises:
   extracting said positional information from said converted tagged documents and resorting said tagged documents in accordance with said positional information, and
   deleting said positional information from said tagged document to restore said original structured document in XML format.

16. A computer readable storage medium stored program for converting a structured document, said program comprising:
   a program for dividing a structured document in XML format, which is composed of tagged documents listed sequentially and ordered hierarchically, by tags; and a program for converting said structured document into tagged documents that added positional information comprising an index indicating an order of a respective tagged document in the structured document and a depth of the respective tagged document defined by the XML structured document format in said structured document, wherein said converting program comprises a program for converting the structured document into a new structured document in XML format by adding said index and said depth information-as attribute values restricted by a namespace so that the structured document can be restored.

17. A computer readable storage medium stored program for restoring tagged documents converted according to claim 16, said program comprising:

a program for resorting said tagged documents in accordance with said added positional information of said converted tagged documents; and a program for deleting said positional information from said tagged documents.

18. A computer readable storage medium stored program for converting and restoring a structured document in XML format, said program comprising:

a program for dividing a structured document in XML format, which is composed of tagged documents listed sequentially and ordered hierarchically, by tags;

a program for converting said structured document into tagged documents that added positional information comprising an index indicating an order of a respective tagged document in the structured document and a depth of the respective tagged document defined by the XML structured document format in said structured document;

a program for resorting said tagged documents in accordance with said added positional information of said converted tagged documents; and a program for deleting said positional information from said tagged documents, wherein said converting program comprises a program for converting the structured document into a new structured document in XML format that added index and depth information for said structured documents as attribute values restricted by a namespace.

* * * * *